Sept. 18, 1973     D. M. BOYD     3,759,820
CONTROL OF MULTI-REACTION ZONES IN RESPONSE TO
TWO QUALITIES OF PRODUCT Filed May 11, 1972     3 Sheets-Sheet 1

United States Patent Office 3,759,820
Patented Sept. 18, 1973

3,759,820
CONTROL OF MULTI-REACTION ZONES IN RESPONSE TO TWO QUALITIES OF PRODUCT
David M. Boyd, Clarendon Hills, Ill., assignor to Universal Oil Products Company, Des Plaines, Ill.
Continuation-in-part of application Ser. No. 146,400, May 24, 1971. This application May 11, 1972, Ser. No. 252,379
Int. Cl. C07c 15/10; C10g 39/00
U.S. Cl. 208—64
19 Claims

ABSTRACT OF THE DISCLOSURE

The method and means of controlling the output of a multi-zone reaction installation about a desired conversion level and at optimum performance conditions. An input to each reaction zone is regulated to control the severity of reaction in the individiual zones. Such regulation is controlled by means including a regulatable set point for each reaction zone. The discharge effluent from the downstream reaction zone is analyzed and the signal responsive to the character of such effluent is used to determine a first and second quality of the effluent stream. The optimizer receives a second quality signal which has been modified by means which alters the signal sent to the optimizer by the extent that the first measured quality has deviated from a preset value. The optimizer analyzes the signal fed to it and then determines a second output signal necessary for each reaction zone to approach an optimum performance in the reaction zones. A controller utilizes the signal indicative of the first quality of the effluent and determines an output signal representing a first component of the regulatable set points. The first and second outputs signals are combined and are utilized as the regulatable set points for controlling the regulation of the severity of reaction in each reaction zone.

CROSS-REFERENCE TO RELATED APPLICATION

This application is a continuation-in-part application of my pending application S.N. 146,400, filed on May 24, 1971. All the teachings of said pending application are incorporated into this application by specific reference thereto.

BACKGROUND OF THE INVENTION

Field of the invention

The field of art to which this invention pertains is reaction zone control. More particularly the present invention relates to a process for controlling a multiple reaction zone process by maintaining one of two measured ualities of product at a preset value and optimizing the other quality.

Description of the prior art

Existing multi-reactor zone processes in which at least two different but dependent qualities are measured include hydrocracking, reforming and dehydrogenation. In most instances it is desired to control one of these qualities at a constant value while optimizing the other quality. Specifically, in reforming a constant octane number may be desired along with a maximum quantity yield of liquid product produced. In multi-reaction zone, reforming processes the inlet temperatures may be varied together identical amounts to maintain a constant octane number of the effluent. Both the octane and liquid yield are modified by a change in the relationship of the inlet temperatures to each other (reactor inlet temperature profile). I have found and previously claimed in my pending parent application that by changing all the inlet temperatures by the same amount (upwards or downwards) that the octane number of the effluent can be maintained at a constant value. I also found that by varying the inlet temperature relationship to each other (the reactor inlet temperature profile) that liquid yield can be optimized. However, associated with the liquid yield optimization there will be some minor deviations of the octane number because of built-in lag in the system or the inherent relationship of octane number of liquid yield when a change is made by a variance in the inlet temperature profiles. In instances in which the optimization procedure causes a change in the octane number from the desired level, there will be in addition to the true change in the liquid yield caused by the optimization procedure, a yield change which is caused by the deviation from the desired value of the octane number. My invention utilizes a compensation procedure which causes the measured liquid yield to be compensated to the extent of any yield change caused by a deviation of measured octane from the desired constant octane number.

As understanding of the reaction mechanisms occurring within a reforming zone has increased, it has become possible to adjust operating techniques and catalyst compositions to enhance the specific reaction desired. Thus, it is a primary purpose of catalytic reforming to subject a substantially sulfur-nitrogen-oxygen-olefin and metal free gasoline boiling range or naphtha charge stock to high temperature under pressure in the presence of hydrogen in order to enhance the anti-known properties of the hydrocarbons contained therein. It has been determined that such enhancement, resulting in a high octane gasoline product, is derived from four specific chemical reactions; (1) the dehydrogenation of naphthenic hydrocarbons to produce corresponding aromatic derivative; (2) the dehydrocyclization of paraffinic hydrocarbons to produce corresponding aromatic hydrocarbons; (3) the hydrocracking of high molecular weight hydrocarbons to produce lower molecular weight hydrocarbons; and, (4) the isomerization of normal paraffinic hydrocarbons to produce branched chained isomers of equal molecular weight.

Each of these four reaction mechanisms upgrade low octane hydrocarbons to high octane hydrocarbons, but it has become necessary to adjust operating techniques in order to control the reaction mechanisms selectively to maximize octane with minimum loss of liquid product yield and minimum production of light paraffinic gas (methane, ethane, and propane). It has thus been determined that the dehydrogenation of naphthenes to aromatics is promoted by operating at low pressure levels; the dehydrocyclization of paraffins to aromatics is promoted by low pressure and high temperature; and hydrocracking of paraffins is promoted by high pressure, high temperature, and high residence time of the charge stock on the catalyst; and that isomerization of paraffins is promoted by intermediate temperature, and a catalyst comprising a much higher halogen content than normally employed. Since aromatic hydrocarbons have higher octane ratings than other hydrocarbons of equivalent molecular weight, catalytic reforming has shown a current tendency to operate at higher temperatures and lower pressures in order to enhance the resulting gasoline octane rating by increasing the aromatic hydrocarbon content of the gasoline. Therefore the catalytic reforming unit producing high octane motor fuel, typically is maintained at operating conditions sufficient to enhance the dehydrogenation of naphthenes and the dehydrocyclization of paraffins in order to maximize the production of both aromatics and hydrogen, maximum hydrogen being desired since it is normally consumed elsewhere in the typical petroleum refinery. The production of aromatic hydrocarbons is enhanced by catalytic reforming at a temperature in the range of from about 850° F. to about 1050° F. and at a pressure in the range of from about 100 p.s.i.g. to about 400 p.s.i.g. when the end boiling point of the charge stock is about 350° F., but when the end point of the charge stock is about 400° F. or more, the preferred pressure is about 500 p.s.i.g. in order to maintain catalyst stability.

The operator of the catalytic reforming unit judiciously selects the operating conditions which he believes will most economically produce the desired high octane gasoline. The naphtha charge stock is passed into the reaction zone under conditions of temperature, pressure, catalyst composition, hydrogen to hydorcarbon ratio, etc. which will produce a reactor effluent having the composition necessary to result in the desired high octane product. When analysis indicates that the product does not meet octane specification, it is normal in the art for the operator to manually change conditions within the reaction zone to compensate for any deviation from specification.

The resulting hot vaporous reactor effluent containing hydrogen, normally gaseous hydrocarbons and gasoline boiling range hydrocarbons is withdrawn from the reaction zone, cooled, condensed, and passed to a separation zone which is normally a single stage gravity-type phase separator maintained at reforming pressure of, say, 50–500 p.s.i.g. The liquid hydrocarbon or unstabilized reformate phase is in equilibrium therein with the gas phase containing a major proportion of the hydrogen. The hydrogen-rich vapor phase is withdrawn and a portion thereof is recycled to the inlet of the catalytic reforming zone for circulation across the catalyst together with the naphtha charge. The liquid hydrocarbon phase from the separator is then ultimately fed to a distillation zone which normally comprises a stabilizer column. The liquid phase contains a substantial portion of dissolved hydrogen and $C_1$–$C_4$ hydrocarbons which must be removed in order that the stabilized reformate will meet vapor pressure and octane number specifications. A typical sample of catalyst reformate from a separator operating at 250 p.s.i.g. consists of:

| Component: | Mole percent |
| --- | --- |
| $H_2$ | 2.5 |
| $C_1$ | 0.5 |
| $C_2$ | 1.5 |
| $C_3$ | 2.5 |
| $i$–$C_4$ | 2.5–3.5 |
| $n$–$C_4$ | 2.5–3.5 |
| $i$–$C_5$ | 3.5–5 |
| $n$–$C_5$ | 3.5–5 |
| $C_5$–400° F. endpoint | 81.0–76.0. |

The overhead from the stabilizer column is prodominately $C_4$ and lighter hydrocarbons, and the column bottoms is stabilized gasoline typically comprising predominately $C_5$ to about 400° F. endpoint material.

Usually, reforming reaction zones are run with excessive heat input in order to guarantee that the octane quality of the reformate gasoline will meet specification. Then that result is that the resulting reformate will actually exceed specifications with respect to octane a good part of the time. This mode of operation increases the refiner's cost, since, as those skilled in the art know, decrease in product yield accompanies increase in the product octane number.

Prior attempts have been made to continuously control the heat input to a reforming reaction zone to maintain a predetermined octane quality of the liquid yield of the reaction zone. However, as the reaction severity is increased without regard to the yield there is always a danger that the resulting yield loss will far outstrip the resulting value of the octane enhancement of the yield. Thus, we have found that we can maintain product of desired octane number and optimum performance conditions by controlling the severity of each reaction zone with controllers having regulatable set points. The set points will comprise a signal proportional to the desired octane value of the product yield as well as signals which optimize the liquid yield of the reforming reaction zone.

In the dehydrogenation of ethylbenzene to the styrene, a mixture of ethylbenzene and steam is passed over the fixed bed of dehydrogenation catalyst. In order to heat the reactants to reaction temperature, it is the general practice to admix the ethylbenzene, which is usually at the temperatures significantly below reaction temperature, with steam which has been superheated to a temperature above the reaction temperature so that the admixture is at reaction temperature as it passes over dehydrogenation catalyst. Since the basic chemical reaction involved, namely the dehydrogenation of ethylbenzene to styrene, is endothermic there is a significant decrease in the reaction zone temperature as the reaction proceeds. Naturally, as the temperature decreases, the repetity of the reaction also decreases so that the overall conversion percentage of ethylbenzene in the process declines to a point where it would be economically unattractive. The temperature of the superheated steam may be increased so that the temperature between the inlet temperature of the reactants and the outlet temperature of the reaction products average equals the required reaction temperature. However, it is noted that at higher temperatures when the superheated steam is admixed with ethylbenzene, the ethylbenzene undergoes, to some extent the decomposition or cracking through a pyrolytic reaction. In many instances such pyrolysis is effected to a degree that the process becomes uneconomical due to the loss of ethylbenzene to toluene, benzene, as well as the products of carbon monoxide, carbon dioxide, polymeric materials, tars, and the like. Prior art has suggested means for increasing the level of conversion by utilizing stepped beds and introducing a separate stream of steam between such catalytic beds or zones in order to reheat the reactants to reaction temperature. These schemes do have merit and in fact do increase efficiency of conversion. However, it is still desirable that those skilled in the art be furnished with an improved method for the conversion of ethylbenzene to styrene wherein conversions as high as 80% are obtained and wherein capital investment, utility, and catalyst costs are maintained at an attractive economic level. The present invention provides for such a system by providing for controls for maintaining a desired conversion value and by optimizing by minimizing the production of the undesirable products of toluene and benzene.

SUMMARY OF THE INVENTION

The present invention can be summarized as a multi-reaction zone control system in which two qualities of an effluent from said system are measured. One quality is controlled at a preset value while the other quality is optimized. The control system contains means to regulate the severity of reaction in each reaction zone in response to a regulatable setpoint for each reaction zone. Signals passed to each setpoint comprise a signal derived from one of the measured qualities and another signal derived from an optimizer means which optimizes one of said qualities. A signal which is passed to the optimizer is modified to the extent that there is a change in the optimized quality caused by a deviation from the desired value of the other quality.

A broad embodiment of my invention resides in combination with at least two reaction zones having inlet means for introducing an inlet effluent therein and outlet means for discharging effluent therefrom, a control system which maintains a desired effluent stream first measured quality at a first preset value while optimizing a second measured quality of said effluent stream, wherein said qualities are so related that a change in said first quality causes a change in said second quality, comprising:

(a) Regulating means connected to each reaction zone for regulating the severity of reaction therein;

(b) A control means connected to each regulating means for controlling the regulation thereof, each control means including a regulatable setpoint;

(c) Analyzing means communicating with the effluent of a reaction zone for producing a first output signal representing a first component of said regulatable setpoint which is responsive to the first quality of the effluent and a second quality signal responsive to the measured second quality of the effluent;

(d) Compensation means connected to the analyzing means for modifying said second quality signal in a manner to produce a compensated second quality output signal which reflects the change in said second quality caused by deviation from said preset value of the first quality;

(e) Optimizer means connected to the compensation means for optimizing the performance of said reaction zones said optimizer means including means for determining a second output signal for each control representing a second component of the foresaid regulatable setpoint and including computer means for analyzing the compensated outputs signal of said performance indicating means to determine the second output signal necessary for each reaction zone to reach an optimum performance of said reaction zones by optimizing said compensation signal; and (f) Means communicating to said compensation means, to said analyzing means and to said control means for combining each first output signal with the second output signal to thereby generate signals representing each foresaid regulatable setpoint.

Figure 1:
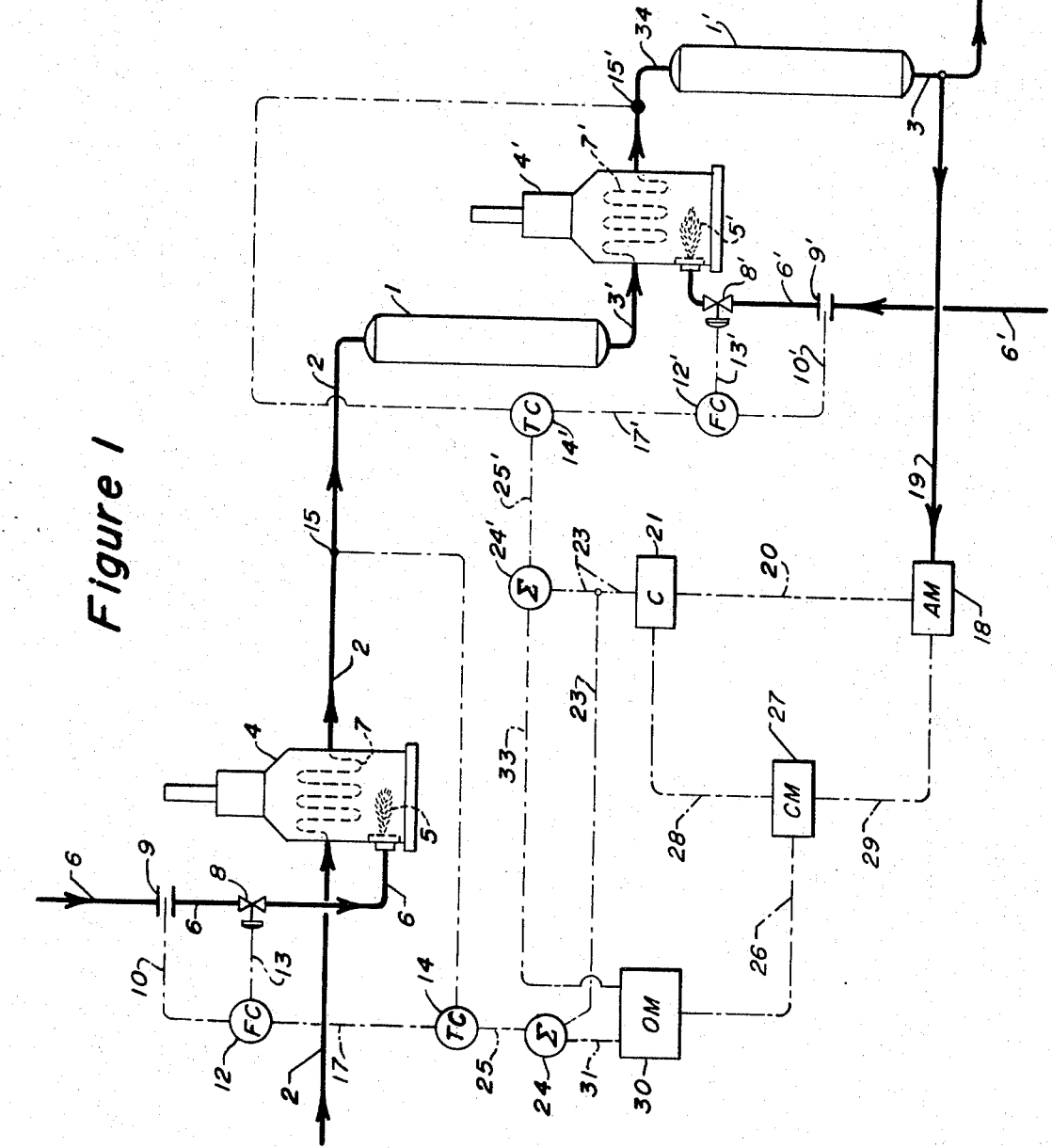
FIG. 1 illustrates schematically reaction apparatus having two reaction zones wherein the heat input to each zone controls the regulation of the rate of reaction or severity of reaction.

With reference now to FIG. 1 there is shown a simplified schematical flow diagram for a typical reaction installation. Reactors 1 and 1' may be one of the many reactors utilized in reaction processes as for example catalytic reforming, ethylbenzene dehydrogenation, thermocracking, catalytic cracking, thermo hydrocracking, catalytic hydrocracking, isomerization, alkylation, polymerization and the like. Reactor 1 has inlet means 2 for introducing the inlet effluent therein. A heater 4 is provided in conjunction with inlet 2 and may be any type of heat exchanger employing any type of heating medium such as steam, hot oil, hot vapor flue gas, etc. In the embodiment of FIG. 1 the heater 4 is a direct fired furnace having a burner 5 which is supplied through line 6 with fuel. The reaction mixture or effluent is heated within coils 7 in heater 4.

The heated reaction mixture leaves heater 4 via line 2 and is passed into reaction zone 1 at a pressure which of course will depend on the particular reaction desired. The effluent from reaction zone 1 is discharged through outlet 3' and is passed through downstream reheater 4' of similar configuration as heater 4. The reacted mixture leaves this heater and is passed into reaction zone 1' via inlet 34. The total reaction zone effluent is discharged through outlet line 3 for storing or further processing. The regulation of the rate of reaction of severity in the reactors in this particular embodiment is by the heat input into each reaction zone. The heat input to the reaction zone is provided by introducing a fuel via lines 6 and 6' into the combustion burners 5 and 5' within heaters 4 and 4'. Fuel, which may be liquid or gas is burned within the combustion zones and the hot combustion gases pass through the furnaces and out the stacks. As the fuel is burned and the combustion gas passes through furnaces, the necessary heat is put into the reaction mixture contained within coils 7 and 7' by means of radiation and convection.

The heat input into the reaction effluent is controlled and adjusted by varying the flow of fuel to combustion burners 5 and 5'. This control of flow of fuel is achieved by means of a flow control loop contained in lines 6 and 6'. The flow control loop comprises control valves 8 and 8' and flow sensing means 9 and 9', which for illustrative purposes are shown as orifices. Flow signal lines 10 and 10' transmit the flow signal from each orifice 9 and 9' to flow controllers 12 and 12'. Flow controllers 12 and 12' then transmit an output signal to the control valves 8 and 8' via lines 13 and 13'. The set point of flow controllers 12 and 12' is automatically adjustable or regulatable.

Temperature controllers 14 and 14' also with automatically adjustable set points, sense inlet temperature of the reactors, as detected by thermocouples or other sensing means 15 and 15' located in inlet lines 2 and 34 of the reactor. The resulting temperature output signals are transmitted from temperature controllers 14 and 14' to flow controllers 12 and 12' via lines 17 and 17' to adjust or reset the set points of flow controllers 12 and 12' via lines 17 and 17' to adjust or reset the set points of flow controllers 12 and 12' respectively.

Analyzing means 18 is installed to be in communication with the outlet effluent of the downstream reactor 1 via line 19. Line 19 represents a suitable sampling system to provide a continuous sample of the outlet effluent of the reactor installation. The sample is withdrawn from line 3 and is passed into analyzing means 18 for analysis. The analyzing means 18 of FIG. 1 should be constructed to include analyzing means capable of producing signals responsive to the character or quality of the outlet effluent. The analyzing means may include analyzers such as chromatographs, continuous octane monitors, as well as continuous flow monitors which determine the total flow through outlet 3, and may be combinations of those type apparatus. At least two outlet signals are determined by analyzing means 18 and should represent the two qualities which the operator seeks to control. In this specification the first quality is the quality which is generally maintained at a preset value while the second quality is generally optimized in value. A conversion level which can represent a first quality defined as an octane number output signal is transmitted via line 20 to a recorder 21. Controller 21 has a set point which is adjustable and which is adjusted to the preferred conversion level. As for example, if the conversion level is to be determined by the octane value of the liquid yield in line 3, controller 21 will have a set point corresponding to the desired octane value of the outlet effluent in line 3. The output signal from the controller 21 is transmitted via line 23 through summing amplifiers 24 and 24'. The output signal from the summing amplifiers 24 and 24' which will be the total signal from controller 21 and from an optimizer 30 is transmitted via lines 25 and 25' to the set points of the temperature controllers 14 and 14'.

A set forth previously, analyzing means 18 will also be capable of determining a signal or signals to be utilized for determining a performance index or second quality of the reactor installation. For example, analyzing means 18 may be a chromatograph which would generate a second quality signal determinate of the amounts of undesirable products in the outlet effluent and a signal determinate of the desirable products in the outlet effluent. These two signals may be transmitted via line 29 to compensation means 27 which modifies the second quality signal to produce a compensated second quality signal which passes via line 26 to optimizer means 30. Compensation means 27 changes the second quality signal passed to it to reflect a change in its value caused by a deviation of the first quality signal value from a desired preset value which controller 21 attempts to maintain. Compensation means 27 is connected to controller 21 by line 28 so that the compensation means can sense any deviation of the first quality signal derived from analyzing means 18 from the set point value of controller 21. By compensating the signal which passes into the optimizer means 30 it is not "tracked" by sensing a change in the second quality caused by a change in the first quality. Of course the first and second qualities should be related so that a change in the first quality affects the second quality or the compensation means will serve no useful purpose in my control system.

A performance index determination device may be inserted in the control system in line 29. This device may be an operational amplifier capable of determining a function of the signals from the analyzing means 18 which is indicative of the performance of the reactor and which is capable of being optimized. By way of example, a performance index determination device may be an operational amplifier capable of determining the ratio of the signal representing a second quality which can be the quantity of undesirable products in the reaction effluent to the signal representing the quantity of the desirable products in the reaction effluent. This signal can be transmitted to compensation means 27 for eventual transmission to optimizer means 30. The optimizer has means for determining an output signal for the control means of each reaction zone which are then transmitted via lines 31 and 33 to the summing amplifiers 24 and 24', respectively. Thus, the output signals in lines 31 and 33 representing second components of the set points of the temperature controllers and the output signal of line 23 representing a first component of the set points for the temperature controller are combined in summing amplifiers 24 and 24' and transmitted to the set points of the temperature controllers via lines 25 and 25'.

Figure 2:
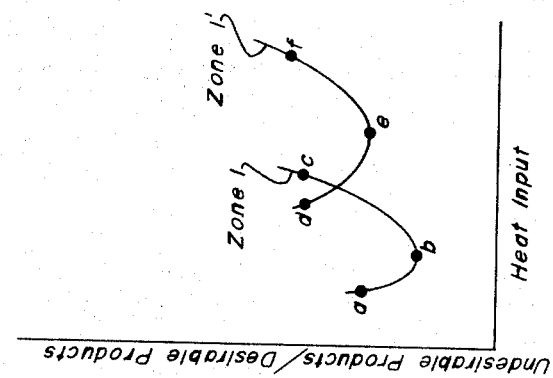
FIG. 2 illustrates schematically hypothetical performance curves of a reactor installation.

The optimizer 30 has computer means to measure compensated quality signal passing through line 26 and to determine the output signal necessary for each reaction zone to approach an optimum performance in the reactor vessels. Optimizer 30 is a device well known in the art which maximizes or minimizes some measure of process performance. By way of example, assume that the reactor's compensated second quality represents the ratio of undesirable products to desirable products in the product effluent and this ratio will vary with the heat input to each reaction zone. It is noted that the ratio for each reaction zone goes through a minimum at point where the slope of the curve is zero as shown in FIG. 2 of the drawing. It zone 1 is operating at the position as shown as point "A" on the curve, and zone 1' is operating at point "D" of its curve, the optimizer computer will determine the output signals necessary to alter the set points of the respective temperature controllers so that the ratio of undesirable products to desirable products will approach "B," and "E' respectively, the minimums on the curves. Likewise, if point "C" is the point on the curve which zone 1 is operating, and "F" is the point in the curve where zone 1 is operating, the optimizer's computer will determine output signals necessary so that the severity of each reactor zone will approach "B" and "E" respectively on the curves. It makes no difference if an optimum actually exists or at which point it exists. The optimizer adjusts its outputs to improve the performance. Reference may be made to pp. 22–52 through 24–54 Perry's Chemical Engineering Handbook, fourth edition, published by McGraw-Hill Book Co., for a brief description of optimizer theory.

There are various types of optimizers on the market, including Motorola Veritrak performance optimizer controller manufactured by Motorola, Instrumentation and Control Inc. of Phoenix, Ariz., a subsidiary of Motorola, Inc. This particular optimizer is an analogue computer that operates on the principle of introducing small output changes and noting the effect on the index or indices it scans. By noting the effect, it can reach a decision to change the output signals necessary to approach an optimum performance of the reactor. The performance index or second quality it scans need not be the index of each reaction zone for the optimizer. It may be set up to only scan the performance index or second quality of the total reaction zone effluent defined by zones 1 and 1', although theoretically the optimizer may scan more than one performance index. If only scanning the total performance index, preferably the small perturbations or changes in each reaction zone are made out of sequence with each other. By making the perturbations out of sequence, the optimizer can more readily differentiate which perturbation in which reaction zone caused the overall performance index to change and thus make its decision as to each reaction zone.

If the conversion level of the reaction installation can be defined by a ratio of desired products in the product effluent outlet 3 to the unreacted reactants in the product effluent outlet, upon change in this number the analyzing means 18 first quality output signal passing through line 20 will transmit a new signal. Controller 21 will transmit an output signal through transmitting line 23 to the summing amplifiers 24 and 24'. This signal would be a first component of the temperature controller set points and would correspond to a value which would make the total reaction severity lie within the desired conversion level which can be controlled at a preset value. Preferably the decisions of controller 21 are made out of sequence with any changes made by the optimizer so the causes of any changes in the second qualities are recognizable. If the ratio of undesired products to desirable products in the product effluent conduit 3 is indicative of the performance of the reactor and can represent a second quality analyzing means 18 will be of the type that can analyze such quantities and transmit signals indicative thereof. These signals wil be transmitted via line 29 to compensation means 28 with the compensated second quality signal passing to optimizer 30 via line 26. The optimizer 30 would determine the output signals that would cause the reaction severity of each reaction zone to approach a ratio of undesirable products to desirable products corresponding to a minimum. This signal would be transmitted via line 31 and 33 to summing amplifiers 24 and 24' where the signal from line 23 would be added to any existing from signal line 23. The two combined signals would make up the set points of the temperature controllers 14 and 14' which would in turn adjust the set points of the controllers 12 and 12' thus affecting the heat input to each reaction zone.

Figure 3:
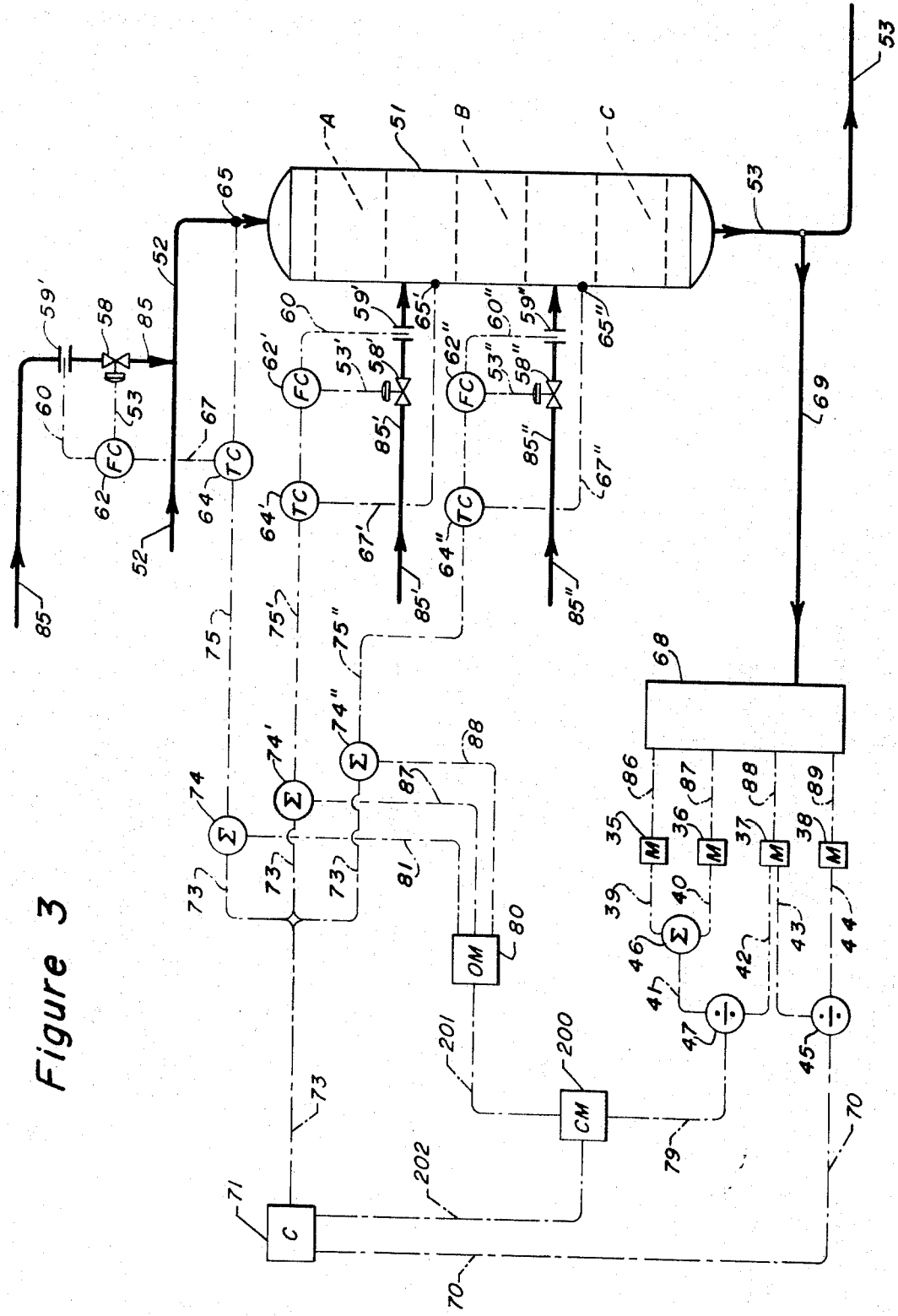
FIG. 3 illustrates schematically a typical reactor system which may be utilized for the dehydrogenation of ethylbenzene to styrene and which uses the control system of the present invention.

Referring now to FIG. 3 of the drawing there is again shown a reactor 51 which in this particular embodiment is a three stage reactor having catalyst zones A, B, and C. This particular reactor is useful for the rehydrogenation of ethylbenzene to styrene. The catalyst employed for this dehydrogenation reaction is preferably an alkali-promoted iron catalyst. Typically, such a catalyst may consist of 85% by weight ferrous oxide, 2% by weight of chromia, 12% by weight of potassium hydroxide, and 1% by weight of sodium hydroxide. Other catalyst compositions include 90% by weight iron oxide, 4% by weight chromia, and 6% by weight potassium carbonate. While these known commercial dehydrogenation catalysts are preferred, other known catalysts may be used, including those comprising ferrous oxide-potassium oxide, other metal oxides and/or sulfides, including hose of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. Similarly, the various methods of preparing the aforesaid catalysts are well known within the prior art.

The amount of catalyst contained in each catalyst bed may be varied considerably. Usually, the amount of catalyst is expressed in terms of bed depth which may range from 6 inches to 50 to 60 feet, depending upon such conditions as alkylated aromatic hydrocarbon feed rate and the amount of heat which therefore must be added to effectuate the reaction at an economical rate. Typically, the bed depth may range from 2 feet to 6 feet.

The reactor pressure may also be varied over a considerable range. Preferably atmospheric pressure, e.g., 4–20 p.s.i.g., is used; although, in some cases, subatmospheric or significant super-atmospheric pressure may be desirable. Sufficient pressure must be maintained at the reactor inlet to overcome the pressure drop through the multi-beds of catalyst contained in the reactor vessels or in separate vessels if each such bed is contained in a separate reactor. Although the preferred arrangement of the reaction zones for styrene production is shown as multiple beds contained in a single reactor, single beds in multiple reactors, may be used in the practice of this invention.

As the reactants contact the catalyst contained in, for example, the first catalyst bed, there is a temperature and pressure decrease observed across the catalyst bed due to the endothermic nature of the reaction and due to the pressure drop characteristics of the reactor design including the presence of catalyst therein. For example, without additional heat being required, the temperature of the effluent leaving the first catalyst bed would probably be in the order of 100° F. or more, less than the inlet temperature selected for the combined charge material to the first catalyst bed. Similarly, depending upon the amount of catalyst contained in the first reaction zone, the pressure of the effluent from the first catalyst bed preferably would be less than 10 p.s.i.g. lower than the selected pressure for the combined charge to the first catalyst bed. Typically, the pressure drop through the first catalyst bed would be within the range from 2 to 6 p.s.i.g. and if a similar pressure drop were observed across, for example, three (3) catalyst beds, the total pressure required at the inlet of the first catalyst bed would be significant, e.g., in the range from 6 to 18 p.s.i.g. Superheated steam at a temperature of about 1400° F. is introduced into the inlet 52 to the reactor via steam line 85 at a ratio of about .65 pound of steam to 1.0 pound of ethylbenzene and is admixed with the ethylbenzene to a nominal temperature of about 1200° F. (as defined in the prior art the dehydrogenation of ethylbenzene is generally affected at a reactor temperature within the range of about 932 to 1292° F.). A second steam line 85′ is used to introduce superheated steam at a nominal temperature of about 1500° F. in between catalyst zones A and B at a ratio of about 1.0 to 1.2 pounds of steam to effluent to raise the temperature of the total effluent to reaction temperatures. A third steam line 85″ is used to introduce superheated steam at a nominal temperature about 1500° F. into admixture with the total effluent between zones B and C at a ratio of about .80 to 1.35 pounds of steam to effluent to raise the temperature of the effluent to reaction temperatures. The total outlet effluent having a temperature within the range of about 1000° F. to 1400° F. is discharged through outlet conduit means 53.

A flow control loop is provided for each steam inlet to vary the flow of steam into the reactor at each point of introduction to thus control reaction zone severity. The flow control loop comprises flow control valves 58, 58′ and 58″ receiving output signals via lines 53, 53′ and 53″ from flow controller 62, 62′ and 62″ respectively. Flow controllers 62, 62′ and 62″ receive the flow rate signals from sensing means 59, 59′ and 59″ via flow signal lines 60, 60′ and 60″ respectively. Flow controllers 62, 62′ and 62″ have adjustable set points which are reset by the output signals of temperature controllers 64, 64′ and 64″ respectively, said output signals being transmitted via line 67, 67′ and 67″. Each temperature controller receives a temperature signal from the inlet of each reactor zone A, B, and C respectively by means of temperature sensing devices such as thermocouples 65, 65′ and 65″. Temperature controllers 64, 64′ and 64″ also have adjustable set points.

The product effluent from outlet 53 is sampled by an analyzing means 68 by means of a sampling loop 69. The analyzing means 68 may be a chromatograph capable of determining output signals of the products and/or reactants in the outlet effluent. For styrene production, the output signals which are utilized in the present invention are: quantity of benzene; quantity of toluene; quantity of styrene; and quantity of ethylbenzene. These signals are transmitted via lines 86, 87, 88 and 89 respectively to four input memory amplifiers 35, 36, 37 and 38 respectively. Preferably, the signal that the memory amplifiers will accept will indicate only the peak height of these products: benzene, toluene, styrene and ethylbenzene although filtered or average values may be used. The output of the styrene memory amplifier 37 and ethylbenzene memory amplifier 38 are transmitted via lines 43 and 44 to a divider 45 and the quotient output signal representing the ratio of styrene to ethylbenzene (the first quality) is transmitted to a recorder controller 71 via line 70 having a set point adjusted to maintain the desired ratio of styrene to ethylbenzene at a preset first quality value. The output of this controller is fed simultaneously through the three summing amplifiers 74, 74′ and 74″ via line 73 whose output is finally transmitted to the temperature controller set points via line 75, 75′ and 75″.

The output of the benzene memory amplifier 35 and toluene memory amplifier 36 is transmitted via lines 39 and 40 to a summing amplifier 46. The signal of summing amplifier 46 represents the sum of benzene and toluene and its signal is transmitted via line 41 to divider 47. The output of the styrene memory amplifier 37 is transmitted via line 42 to the divider 47 and the output of the divider which represents the second quality which is the ratio of benzene plus toluene to styrene, $$\frac{(B+T)}{S}$$

is transmitted via line 79 to compensation means 200.

Compensation means 200 senses a deviation of the first quality signal passing through line 70 from the desired preset value which controller 71 attempts to maintain. Any deviation can be sensed via line 202.

When a deviation from set point of the first quality occurs the compensation means 200 causes the second quality signal sent to it to be modified to correct any changes in the second quality value caused by a deviation of the first quality from its desired set point value. By doing this the second quality value sent to the optimizer means 80 reflects changes in its value caused by the optimization procedure and not by changes in the first quality.

The optimizer by introducing small perturbations into the control process via the temperature controllers 64, 64′ and 64″ notes the effect on the performance index or second quality, $$\frac{(B+T)}{S}$$

and determines an output signal necessary for each reaction zone to approach an optimum second quality (in this case a minimum). The output signals from the optimizer 80 are transmitted via line 81, 87 and 88 to the summing amplifiers 74, 74′ and 74″. The signals from the summing amplifiers correspond to the set points of the temperature controllers 64, 64′ and 64″ and thus regulate the steam input and consequently the heat input into each catalytically active zones A, B, and C. Thus, the proportional controller 71 adjusts the set point of the temperature controllers 64 in response to a desired conversion level (first quality) determined by the ratio of styrene to ethylbenzene in the conduit 53 and the optimizer 80 adjusts each set point of the temperature controller 64, 64' and 64" by minimizing the ratio of the undesirable products of benzene to toluene to styrene (second quality) in the product effluent.

As was the case in the embodiment of FIG. 1 of the drawing the small perturbations made by the optimizer for making a decision as to each reaction zone are preferably made out of sequence with each other. By making the perturbations the optimizer can differentiate which perturbations in which reaction zone cause the performance index to change and thus make its decision as to each reaction zone. The signals from the proportional controller 71 are the first component of the set points and of course correspond to a value which maintains the ratio of styrene to ethylbenzene within or about a desired range; e.g., 60%. Preferably, any changes made by the proportional controller are made out of sequence with any changes made by the optimizer so causes of any changes in the ratio $$\frac{(B+T)}{S}$$

are recognizable.

Figure 4:
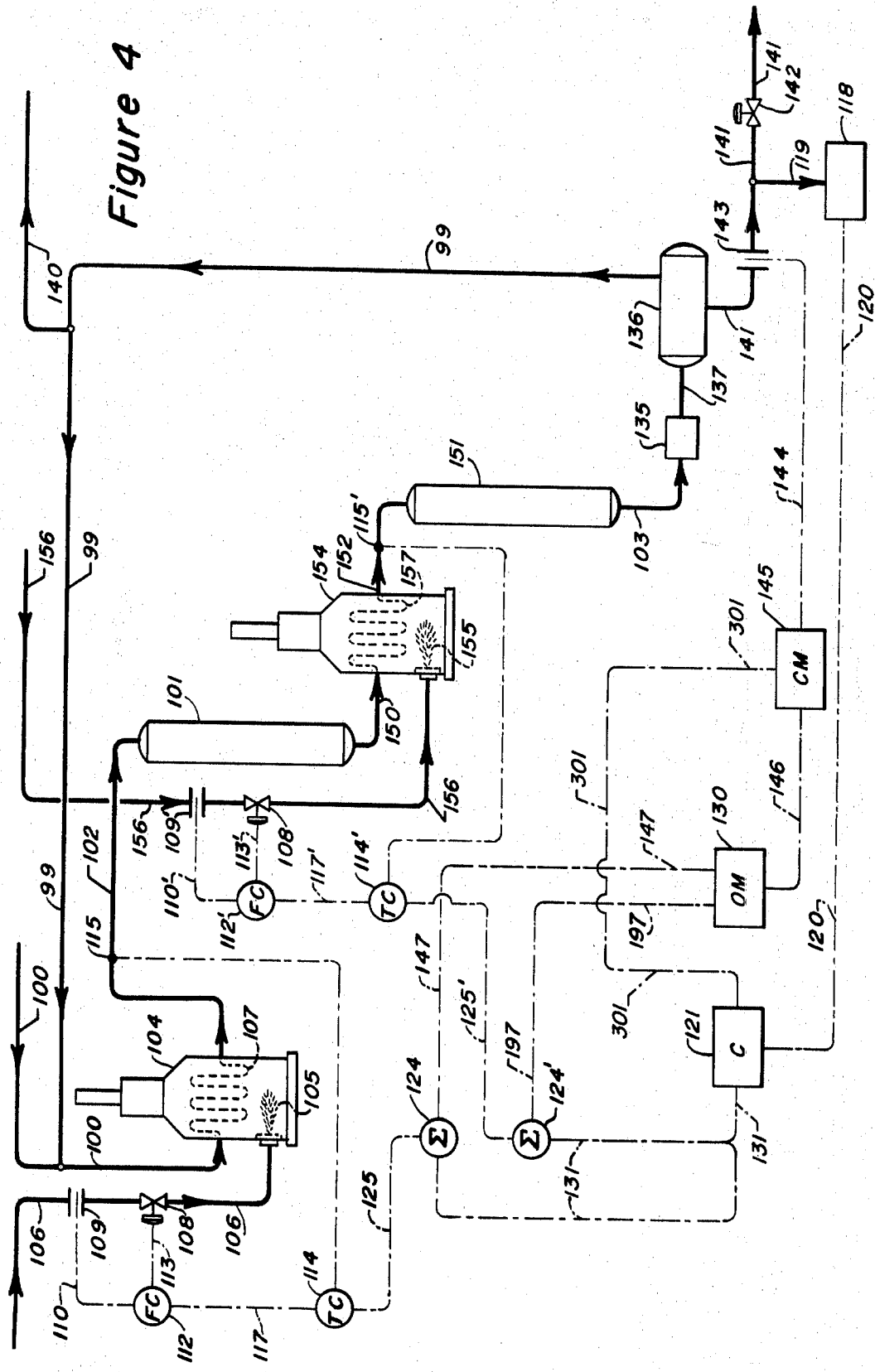
FIG. 4 illustrates a catalytic reforming unit wherein the heat input to two reaction zones is used to regulate the reaction severity.

Referring now to FIG. 4 of the drawing there is shown a simplified schematic flow diagram for a typical catalytic reforming unit which utilizes the inventive control system. A low octane number feedstock comprising naphtha or gasoline boiling range hydrocarbon constituents, having an end boiling point of about 350° F. enters the reforming process via line 100. A recycle gas stream may be injected into line 100 through line 99. The recycle gas stream would comprise predominately hydrogen, with a minor portion of normally gaseous hydrocarbon vapor comprising methane, ethane, and propane, and traces of heavier hydrocarbons. The resulting mixture of hydrogen and hydrocarbon passes into a reactor preheater 104 which may be any type of heat exchanger employing any type of heating medium such as steam, hot oil, hot vapor, flue gas, etc. Normally, however, in order to achieve the high temperature required, preheater 104 will be a direct fired furnace as illustrated. The reaction mixture of the hydrocarbon and hydrogen is heated within a coil 107 of preheater 104. The heated reaction mixture leaves preheater 104 via line 102, typically at a temperature of from 900° F. to 1000° F. depending upon the composition of hydrocarbon feedstock. The hot mixture passes into a first reaction zone comprised of a reactor vessel 101 at a pressure of about 300 p.s.i.g. The reaction zone preferably contains a noble metal reforming catalyst and the reaction mixture undergoes a conversion to lower boiling hydrocarbon constituents having a higher octane number. The reaction primarily comprises dehydrogenation of naphthenes which is an endothermic reaction. Consequently, the reaction mixture leaves the reaction zone via line 150 at a temperature typically from 20° F. to 150° F. below the reactor inlet temperature, depending of course upon the naphthene content of the charge stock. The reactor effluent passes via line 150 to a reheater 154 which may be similar to preheater 104. The effluent is heated within a coil 157. The reheated mixture leaves reheater 154 via line 152 typically at a temperature of from about 900° F. to 1000° F. The hot mixture passes into a second reactor zone comprised of a reactor vessel 151 at a pressure of about 300 p.s.i.g. having suitable catalyst therein whereby such mixture undergoes a further conversion to lower boiling hydrocarbon constituents having a higher octane number. The reactor mixture leaves reaction zone 151 via line 103 at a somewhat lower temperature and passes into a heat exchanger 135 wherein the mixture is cooled and normally liquid constituents are condensed. The condensed and cooled mixture leaves the heat exchanger 135 at a temperature of about 60° to 120° F. and passes into a separator 136 via line 137. Separator 136 will be at a pressure which is substantially the same pressure as the reaction zone, but it will be at a slightly lower level due to pressure drop through the reactor's catalyst beds, line 150, heater 154, line 152, line 103, heat exchanger 135, and line 137. Thus, whereas the reactor 101 will typically be at an inlet pressure of about 300 p.s.i.g., separator 136 will typically be at a pressure of about 250 p.s.i.g. or lower. The condensed and cooled effluent entering separator 136 via line 137 is separated therein into a vapor phase and a liquid phase. The vapor phase is withdrawn via line 99 for recycle to the reaction zones. Compressor means not shown, sends the hydrogen-rich vapor phase via line 99 into line 100 for mixture with the charge stock, as was previously set forth hereinabove. The catalytic reforming reaction not only upgrades the hydrocarbon constituents to higher octane number components, but it also produces hydrogen as a byproduct of the process. Consequently, a net hydrogen-rich gas is withdrawn via line 140 by conventional pressure control means, not shown, as a net gas product which is typically sent to further processing units for consumption elsewhere in the refinery.

The liquid phase containing dissolved gaseous components is withdrawn from separator 136 via line 141 and is passed through a control valve 142 usually into a fractionation zone (not shown). The liquid phase withdraw rate typically is adjusted via a liquid level controller (not shown) which may be operated by a level sensing means in the separator. The level controller would adjust valve 142 by transmitting a pneumatic, electrical, or hydraulic output signal.

Heat input to reaction zones is provided by introducing a fuel via lines 106 and 156 into burner 105 in the preheater 104 and burner 155 of reheater 154 respectively. The fuel, which may be a liquid or gas, is burned within the combustion chambers and the hot combustion gases pass through the furnace and out of the stack. As the fuel is burned and the combustion gas passes through the furnace, it imparts the necessary heat input into the reaction mixture contained within the coils 107 and 157 by means of radiation and convection.

The heat input into the reaction mixture is controlled and adjusted by varying the flow of fuel to the burners 105 and 155. This control flow of fuel is achieved by means of a flow control loop similar to that shown in FIG. 1 of the drawing. The flow control loop of each reaction zone comprises control valves 108 and 108' and flow sensing means 109 and 109' which for illustrative purposes are shown as orifices. Flow signal lines 110 and 110' transmit the flow signals from the orifices 109 and 109' to flow controllers 112 and 112'. Flow controllers 112 and 112' then transmit output signals to respective control valves 108 and 108' via lines 113 and 113'. The set points of flow controllers 112 and 112' are automatically adjustable.

Temperature controllers 114 and 114', also with an automatically adjustable or regulatable set points, sense the reactor inlet temperature as detected by thermocouples or other sensing means 115 and 115' located in the inlet lines 102 and 152 or other suitable inlet portions of the reaction zones. The resulting temperature output signals are transmitted from temperature controllers 114 and 114' to fluid controllers 112 and 112' via lines 117 and 117' to adjust or reset the set points of each flow controller.

An octane monitor 118 which may be the type described in U.S. Pat. No. 3,463,613 issued Aug. 26, 1969, to E. R. Fenske and J. H. McLaughlin is installed in line 143 connected with the liquid discharge of separator 136. It is connected through a suitable sampling line 119 to provide a continuous sample of the liquid phase of the reactor effluent. The sample is withdrawn and passed into the octane analyzer or monitor without intervening depressurization. Preferably, the octane monitor utilized a stabilized cool flame generator with a servo-positioned flame front. In a preferred embodiment, the flow of the oxidizer (air) and (fuel) effluent liquid phase sample are fixed, as is the induction zone temperature. Combustion pressure is the parameter which is varied in a manner to immobilize the stabilized cool flame front. Upon a change in sample octane number, the change in pressure required provides a direct indication of the change of octane num- to immoblize the flame front within the octane monitor ber in the sample deliverd to the combustion chamber of the octane monitor. Typical operating conditions for the octane monitor are:

Air flow: 3500 cc./minute (STP)
Fuel flow: 1 cc./minute
Induction zone temperature: 700° F. (research octane); 800° F. (motor octane)
Combustion pressure: 4 to 20 p.s.i.g.
Octane range (max.): 80 to 102

The sample may be drawn off at a rate of about 100 cc. per minute from a point upstream of the control valve 142 and returning it downstream from the control valve 142 the sample itself being drawn off from an intermediate portion of the sample loop and injected at a controlled rate by a metering pump to the combustion tube of the octane monitor.

The octane monitor output signal (the first quality) is transmitted via line 120 to a recorder controller 121. Upon a decrease in the measured octane number of the liquid phase sample from a preset octane number value, the controller 121 will call for an increase in the reaction zone temperature in order to dehydrogenate a greater proportion of the naphthenes in the charge stock, to produce a greater amount of high octane aromatic hydrocarbon in the effluent. Thus, the recorder controller 121 will call for an increase in the flow of fuel which is done indirectly through summing amplifiers 124 and 124'. In other words, the output of the recorder controller 121 is connected via line 131 to summing amplifiers 124 and 124' and via lines 125 and 125' to the set point of the temperature controllers 114 and 114'. Summing amplifiers 124 and 124' combine the signal from the recorder controller 121 and the signals from an optimizer 130. Thus, considering only recorder controller 121, upon a decrease in the measured octane number of the liquid phase sample, the octane monitor will call for an increase in the reaction zone temperatures in both reaction zones in order to dehydrogenate a greater proportion of the naphthenes in the charge stock, to produce a greater amount of high octane aromatic hydrocarbons in the effluent. Temperature controllers 114 and 114' then will call for an increase in the flow of fuel to the heaters 104 and 154 in order to increase the heat input into the reactants in coils 107 and 157 and thereby increase the temperature of the reaction mixture entering the reaction zones.

If the octane number of the effluent sample is higher than the required specification, controller 121 will call for a decrease in the reaction zone temperature and the overall corrective action will be the reverse of that previously described. The octane number of the liquid phase of the reactor effluent is continuously monitored and the reaction zone is controlled under conversion conditions sufficient to provide a substantially constant preset octane number value in the liquid phase of the effluent.

Although maintaining the octane level of the liquid effluent is accomplished with the octane monitor and recorder controller 121, we have found that this control is not in itself adequate. In other words, maintaining the specification octane number may decrease the yield to such an extent that all savings in the utility costs will be cancelled. Thus, the present invention uses another factor to adjust the set points of the temperature controllers, that being the signals derived from optimizer 130. Optimizer 130 may be of the type previously described which introduces perturbations into the input of each reaction zone and notes the effect on the performance index it scans.

In this particular embodiment, the performance index the optimizer scans is determined by the liquid yield (the second quality). Accordingly there is provided a flow sensing means 143 in line 141 downstream of the separator 136, which for illustrative purposes is shown as an orifice. A flow signal line 144 transmits the flow signal from the orifice 143 to compensation means 145 which receives a signal via line 301 from controller 121. Compensation means 145 modifies the flow signal passing through line 144 to correct its value so that it represents a flow rate corresponding to a value when the measured octane number value is equal to the present octane number value. The flow signal passing to the compensation means 145 may be a peak value although an average or filtered value may be used. The optimizer 130 transmits output signals via lines 147 and 197 to summing amplifiers 124 and 124' respectively. Summing amplifiers 124 and 124' add the signals from line 147 and 197 to the signal from line 131 and transmit these output signals via lines 125 and 125' to corresponding temperature controllers 114 and 114' to adjust the set points thereof.

Thus, considering only the optimizer portion of the control system, it is seen that the optimizer will sense a signal indicating a compensated liquid yield quantity of flow. It will introduce small perturbations into each reaction zone via its output to the temperature controllers 114 and 114' which will vary the heat input into each reaction zone, The optimizer will note whether the liquid yield will increase or decrease and subsequently transmit the individual output signals necessary to increase the liquid yield. It does not matter whether or not there actually exists a maximum condition of yield or of what point the maximum if any does exist. The optimizer merely transmits signals that will increase the yield. But, it will not increase the yield to the exc'usive detriment of the octane value since the octane is being continually monitored and controlled by the recorder controller 121 preferably out of sequence with optimizer 130.

The present invention should not be considered directed to merely a system where the heat input is controlled in order to control the severity of reaction but may be directed on the other hand, to systems where one of the components of the feed is the variable to control the severity of the reaction. Also, it is noted that the temperature controllers used only one sensing means to determine the severity of the reaction in all three embodiments. It is also contemplated to use a temperature controller whose set point is determined by a ΔT across the reaction zone.

The method of operation of the inventive control system is readily apparent to those skilled in the art from the foregoing discussion relative to the drawing. In addition, the advantages of the present invention are equally apparent.

The primary advantage is that the present invention maintains a particular range of operation, e.g. percent conversion, octane level, and yet optimizes a related but not necessarily dependent performance index by regulating the severity of connecting reaction zones. Of course it is to be considered to be within the scope of this present invention to provide the necessary relays, gates, timers, etc. to in turn compensate for lag times inherent in large reactor systems. In addition, it is not absolutely necessary that the signals from the optimizers and from the range of operation controllers be added simultaneously as was set out previously. In other words, the range of operation controller may be set to update the temperature controller set point periodically, for example, every thirty minutes, and the signal from the optimizer may be used to update the temperature controller set point every sixty minutes. Of course other time periods may be considered to be in the scope of this invention.

In the foregoing disclosure the use and application of the improved control system has been disclosed with reference to catalytic reforming and styrene production systems. Those skilled in the art realize, however, that the inventive control system is not so limited. The inventive control system which has been disclosed herein may be utilized in any reaction process such as thermocracking, catalytic cracking, thermo hydrocracking, catalytic hydrocracking, isomerization, alkylation, polymerization, and the like.

Those skilled in the art realize that many conversions and processes employ plural reactor vessels with a preheater at each individual reaction vessel. Thus, it is within the scope of the present invention to apply an embodiment of the inventive control system to more than two or three of preheater-reactor combinations. For example, a catalytic reforming typically employs three or more reactor vessels and corresponding preheaters for three reactor catalytic reforming zones. The method of adapting the present invention to provide other multiple applications of the inventive control system, would be readily apparent to those skilled in the art utilizing the teachings which have been presented hereinabove.

Additionally, while the inventive control system has been disclosed with reference to the control of conversion or reaction severity or rate of reaction by the adjustment and control of heat input, e.g. (1) steam, (2) heaters, those skilled in the art realize that the inventive control system may be utilized to control severity or rate of reaction by the adjustment of any other operating variable. For example, in fluid catalytic cracking the inventive control system may be utilized to control the rate of catalyst circulation. In HF alkylation the inventive control system may adjust reaction severity by adjustments to the rate of circulation of isobutane reactant. In polymerization over solid phosphoric acid the catalyst, the inventive control system may adjust reaction severity by adjusting the rate of flow of olefin reactant to the reaction zone. In each instance, the adjustments to the conversion or reaction severity made by the inventive control system, will result in the production of the ultimate product within the specification, range of operation, and with the performance index optimizer therein.

The components of the control system shown in the drawings are well known to those skilled in the art. The various transmitting lines etc., transmitters, dividers, summing amplifiers, optimizers, sensing devices are available commercially from any number of reputable instrument manufacturers.

DETAILED DESCRIPTION OF THE INVENTION

The present invention is directed to control of the reaction zone severity in a continuous flow reaction process wherein a charge stock is passed through at least two reaction zones at conversion conditions and the resulting product effluent is analyzed. The analysis therefrom is used to determine a performance index and a total conversion level. Controller means is utilized to control the reaction zone severity or rate of reaction to maintain the conversion level. Optimizer means is utilized to optimize the performance index and the signal derived from the optimizer means is used in conjunction with the signal from the controller means to adjust the reaction zone severity. Typical of applicable conversion processes is catalytic hydroreforming, wherein a naphtha fraction is passed into a reaction zone containing noble metal catalysts, in the presence of molar excess of hydrogen. Another hydrocarbon conversion process which may utilize the concept of this invention is the dehydrogenation of ethylbenzene to styrene.

Other processes which may be utilized in connection with the present invention control system include any reaction processes such as thermocracking, catalytic cracking, thermo hydrocracking, catalytic hydrocracking, isomerization, alkylation, polymerization, and the like.

The terms first quality and second quality as used in this specification and claims refer to measurable qualities of an effluent stream from one of the reaction zones or from the end reaction zone where multiplicity of reaction zones is utilized. It is required in order to allow the improvement—namely the compensation means to be effective, that the first and second qualities be interrelated so that a deviation in one would cause a change in the other. Specific examples of interrelated first and second qualities for various processing streams include liquid yield and octane in reforming operations, liquid yield and selectivity in the production of styrene from ethylbenzene, octane and liquid yield in fluidized catalytic cracking, octane number versus olefin polymerization in alkylation processes such as sulfuric or hydrofluoric acid or solid bed alkylation of paraffins and olefins liquid yield and octane number in hydrocracking processes, selectivity of dehydrogenation and yield of dehydrogenation processing, etc.

Specifically as disclosed in this specification, first and second qualities are important in processes in which styrene production takes place or in reforming processing. In reforming operations the first quality can be characterized as the octane number of the effluent stream while a second quality which in the claims is desired to be optimized can be the liquid yield of reformate produced from the reforming reaction zones. In styrene production first quality can be the ratio of styrene to ethylbenzene in any one or the final effluent stream and the second quality can be the ratio of undesirable products to the ratio of desired products—namely, benzene plus toluene over styrene produced.

In reforming operations, especially when attempting to produce reformate having an overall research clear octane number of from about 85 to 100, a correlation can be found for the amount of liquid yield which can be gained or lost in the effluent upon the deviation of that effluent from a preset octane number. In other words, a deviation of the effluent from a desired octane level can cause changes in the liquid yield. It is then possible to compensate the liquid yield measured before that signal is passed into the optimizer to allow the optimizer to receive a corrected or true liquid yield number or signal which represents the optimizer's performance and not the variations of the octane number in the effluent caused by changes in the octane number. I have found that when attempting to produce octane numbers from normal naphtha feed stocks of around 92 research clear octane number that there is a 0.75% liquid yield loss for every octane number above 92 that is measured in the effluent. In other words, as octane number increases liquid yield decreases. Conversely, as the octane number of the effluent material goes below a preset value the liquid yield increases because of the nature of these two variables.

The compensation means can readily compensate the signal passed to the optimizer to take into consideration the yield loss or gain which accompanies a deviation of the octane number of the effluent from a preset value. Since an octane number higher than the preset octane number by one research octane number will cause a liquid yield to be reduced by about 0.75%, in instances in which a measured octane number of the effluent is one research clear octane number higher than the desired preset value the compensation means will increase the signal received by it from the analyzing means so that the signal fed to the optimizing means represents what the liquid yield would be if the second quality was on specification. Conversely in instances in which the measured octane number is below the present octane number desired, the compensation means will substract from the signal fed to it to the extent required so that the liquid yield signal passed into the optimizing means represents the liquid yield when the octane number is at the preset octane number value.

In the claims the first quality of the desired effluent stream may be maintained at a first preset value while a second measured quality of an effluent stream is optimized. It is possible that what was defined as the first quality and held constant, and what was defined as the second quality and optimized, can be interchanged. A specific example is in reforming operations in which the liquid yield of the effluent may be defined as the first quality and maintained at an essentially preset constant value while the octane quality being the second quality is optimized to yield a maximum octane number. In a likewise manner in other operations such as styrene production or fluidized catalyst cracking or alkylation or isomerization the first and second quantities can also be switched around one being optimized while the other is being maintained at a reasonably constant value.

In the claims when defining a first preset value of the first quality it is contemplated that this first preset value may be altered during processing conditions to reflect changes in feed stock, operating conditions including catalyst degradation by loss of activity or temperature changes throughout the system.

Regulating means which are connected to each reaction zone for regulating the severity of reaction therein can include means to change the inlet temperature of the hydrocarbon material passing into each reaction zone or the quantity of another material passing into the reaction zone to regulate the rate of reaction or extent of conversion therein. Other regulating means include heat exchangers to heat and alter the overall temperature within each reaction zone.

The analyzing means which communicates with the effluent stream may communicate with any effluent stream within the multiple reaction system or preferably may communicate with the total and last effluent stream passing out of the series of reactors. The analyzing means can comprise any type of analyzing equipment in which two or more qualities can be determined upon inspection of a portion or all of the effluent stream. In many instances the analyzing means can comprise two distinct measurement devices such as an orifice or turbine meter to measure liquid flow through a conduit and a chromatograph or octane monitor to determine composition or concentration of one or more components of the effluent stream. Specifically in reforming operations, the analyzing means can comprise a device for measuring the liquid yield of the effluent stream passing out of the last reactor and an on-stream octane analyzer which can, in essentially real time, determine the octane number of the effluent stream. It is preferred in reforming operations and in other operations when the liquid stream is measured for one or more qualities that a certain portion of that stream may be segregated from the remainder of it in order to more precisely be able to measure the specific quality desired to be determined. In particular, in instances in which octane number is desired to be measured as one of the qualities the $C_5$ or $C_6$ plus material from the liquid effluent may be analyzed for octane number. When measuring the liquid yield of material passing in the effluent stream from the last reactor in reforming operation the $C_5$ or $C_6$ plus liquid material may be that material which is desired to be measured for liquid content. In instances in which high quantities of low molecular weight materials such as $C_4$ or $C_5$ materials are condensed because of operating pressures a misleading liquid yield may be measured.

The analyzing means can also include devices or apparatus for measuring the quantity of gas produced from the effluent and a breakdown of the gas stream to various components. In some instances the optimizing procedure can include both the maximum production of a $C_5$ plus liquid and the minimum production of light gas components which has methane or ethane. The first and second qualities need not be maximized for good operations. In fact, in some instances the second quality such as methane and ethane production of the reforming zone may be optimized by reducing the quantity of those materials produced to a minimum value. In other instances the optimization procedure will attempt to approach a maximum value of a second quality.

The means used to connect the compensating means to the analyzing means and the control means for combining each of the first output signal with the second output signal can generally include lines through which electrical current can be passed in order to efficiently and reproduceably direct the output signals from one means to an input of another means. In many instances an input or output signal measuring the first and second qualities can comprise a peak measurement or an average measurement depending upon which measurement would give better process control.

I claim as my invention:

1. In combination with at least two reaction zones having inlet means for introducing an inlet effluent therein and outlet means for discharging effluent therefrom, a control system which maintains a desired effluent stream first measured quality at a first preset value while optimizing a second measured quality of said effluent stream, wherein said qualities are so related that a change in said first quality causes a change in said second quality, comprising:
   (a) regulating means connected to each reaction zone for regulating the severity of reaction therein;
   (b) a control means connected to each regulating means for controling the regulation thereof, each control means including a regulatable set point;
   (c) analyzing means communicating with the effluent of a reaction zone for producing a first output signal representing a first component of a said regulatable set point which is responsive to the first quality of the effluent and a second quality signal responsive to the measured second quality of the effluent;
   (d) compensation means connected to the analyzing means for modifying said second quality signal in a manner to produce a compensated second quality output signal which reflects the change in said second quality caused by a deviation from said preset value of the first quality;
   (e) optimizer means connected to the compensation means for optimizing the performance of said reaction zones said optimizer means including means for determining a second output signal for each control representing a second component of the aforesaid regulatable set point and including computer means for analyzing said compensated output signal of said analyzing means to determine the second output signal necessary for each reaction zone to reach an optimum performance of said reaction zones by optimizing said compensation signal; and
   (f) means communicated to said compensation means, to said analyzing means and to said control means for combining each first output signal with the second output signal to thereby generate signals representing each aforesaid regulatable set point.

2. The control system of claim 1 in that said first quality is a function of: (1) the undesirable products in said effluent with respect to (2) the desirable products in said effluent.

3. The control system of claim 1 in that said first quality is a function of: (1) the desirable products of reaction in said effluent with respect to (2) the reactants remaining in said effluent.

4. The control of claim 1 in that said regulating means includes means to regulate the heat input into said reaction zones.

5. The control of claim 1 in that said second quality is a function of: (1) the liquid volume of effluent produced with respect to (2) the liquid volume of feed passed into the inlet to the reaction zones.

6. The control system of claim 1 in that said first quality is the octane rating of said effluent.

7. A method of controlling at least two reaction zones in which a first quality of an effluent is controlled at a preset value while optimizing the value of a second quality of the effluent comprising the steps of:
(a) regulating the severity within each reaction zone;
(b) controlling such regulation in response to a regulatable set point signal for each reaction zone;
(c) analyzing the outlet effluent of the downstream reaction zone to produce a first output signal representing a first component of the aforesaid regulatable set point and responsive to the first quality of said outlet effluent;
(d) determining a performance index of said effluent comprising a second quality signal responsive to a second quality of the outlet effluent;
(e) compensating said second quality signal in a manner to produce a compensated second quality output signal which reflects a change in said second quality caused by a deviation from said preset value of the first quality;
(f) optimizing the performance of said reaction zone by analyzing the compensated signal and determining a second output signal necessary to approach an optimum performance of said reaction zones, said second output signal representing a second component of the aforesaid regulatable set point signal; and,
(g) combining each of the first output signals with the second output signal to thereby generate each aforesaid regulatable set point signal.

8. The method of claim 7 wherein the first quality is a function of: (1) the undesirable products in said outlet effluent with respect to (2) the desirable products in said outlet effluent.

9. The method of claim 7 wherein the second quality is a function of: (1) the desired product in said outlet effluent with respect to (2) the unreacted reactants remaining in said outlet effluent.

10. The method of claim 7 wherein said reaction severity is regulated by regulating the heat input to each reaction zone.

11. In the process of dehydrogenating ethylbenzene wherein ethylbenzene admixed with steam is passed through at least two catalytic reaction zones and a total outlet effluent including the desirable product styrene, the less desirable products benzene and toluene, and unreacted ethylbenzene, is discharged therefrom, a method of controlling such process which comprises the steps of:
(a) regulating the reaction severity within each catalytic reaction zone;
(b) controlling such regulation in response to a regulatable set point signal for each reaction zone;
(c) analyzing the outlet effluent of the downstream reaction zone to produce signals responsive to: (1) the quantity of benzene in said outlet effluent, (2) the quantity of toluene in said outlet effluent, (3) the quantity of styrene in said outlet effluent, (4) the quantity of ethylbenzene in said outlet effluent;
(d) determining the total conversion level from signals (3) and (4) of Step (c), the value of said total conversion level being given by a function of: (1) the quantity of styrene with respect to (2) the quantity of ethylbenzene in the outlet effluent;
(e) determining a first output signal representing a first component of each of the aforesaid regulatable set point signals whose value is determined by the comparison of the desired total conversion level of said reaction zone to the actual total conversion level of each reaction zone determined in Step (d);
(f) determining a second output signal from signals (1), (2) and (3) of Step (c) above, the value of said second output signal being given by a function of: (1) the sum of the quantities of benzene and toluene with respect to (2) the quantity of styrene in said outlet effluent;
(g) compensating said output signal in a manner to produce a compensated second output signal which reflects a change in said second output signal caused by a deviation of the actual conversion determined from the desired total conversion level;
(h) optimizing the performance of said reaction zone by analyzing the compensated second output signal of Step (g) and determining the optimized output signal necessary for each reaction zone to approach an optimum performance of said reaction zones, said optimized outlet signal representing a second component for each of the aforesaid regulatable set point signals;
(i) combining each of the first output signals of step (e) with the optimized output signal of Step (h) to thereby generate each aforesaid regulatable set point signal; whereby said desired total conversion level is maintained at a substantially constant value and said second output signal value is maintained at a substantially maximum value.

12. The method of claim 11 wherein said reaction severity is regulated by regulating the heat input to each reaction zone.

13. In the process of reforming a hydrocarbon charge stock wherein the hydrocarbon charge stock is passed through at least two catalytic reaction zones and a total product effluent is discharged therefrom, a control system which maintains a preset octane number value of the desired effluent stream while optimizing a compensated liquid yield comprising:
(a) regulating the severity of reaction within each catalytic reaction zone;
(b) controlling such regulation in response to a regulatable set point signal for each reaction zone;
(c) analyzing the output effluent of the downstream reaction zone to produce signals responsive to: (1) the measured liquid yield of said product effluent; (2) the octane value of a portion of said product effluent;
(d) determining a first output signal representing a first component of said regulatable set point which signal is responsive to the measured octane value of said effluent;
(e) determining a second output signal which signal is responsive to the measured liquid yield of said product effluent;
(f) compensating said second output signal in a manner to produce a compensated second output signal which reflects a change in said liquid yield caused by a deviation of the measured octane value from the desired preset octane number value;
(g) optimizing the performance of the reaction zones by analyzing the compensated second output signal and determining an optimized output signal necessary for each reaction zone to approach an optimum performance of said reaction zones, said optimized output signals representing a second component for each of the aforesaid regulatable set point signals; and,
(h) combining the first output signal and the optimized output signal to thereby generate each aforesaid regulatable set point signal.

14. The process according to claim 11 wherein the severity of reaction is regulated by regulating the heat input to each reaction zone.

15. The method of claim 13 wherein said octane value is measured on the $C_4+$ liquid effluent.

16. The method of claim 13 wherein said octane value is measured on the $C_5+$ liquid effluent.

17. The method of claim 13 wherein said octane value is measured on the $C_6+$ liquid effluent.

18. The method of claim 13 wherein said measured liquid yield is the quantity of the ratio of $C_5+$ liquid effluent over the total liquid hydrocarbon charge stock used.

19. The method of claim 13 wherein said measured liquid yield is the quantity of the ratio of $C_6+$ liquid effluent over the total liquid hydrocarbon charge stock used.

References Cited

UNITED STATES PATENTS

| | | | |
|---|---|---|---|
| 3,000,812 | 9/1961 | Boyd | 23—253 A |
| 3,458,691 | 7/1969 | Boyd | 23—253 A |
| 3,497,449 | 2/1970 | Urban | 23—253 A |
| 3,592,606 | 7/1971 | Boyd | 208—Dig. I |
| 3,602,701 | 8/1971 | Boyd | 208—134 |
| 3,649,202 | 3/1972 | Bajek et al. | 235—151.13 |

HERBERT LEVINE, Primary Examiner

U.S. Cl. X.R.

23—230 A, 253 R, 253 A, 288 H; 208—Dig. 1; 235—151.13; 260—669